(12) United States Patent
Baker

(10) Patent No.: US 12,022,773 B2
(45) Date of Patent: Jul. 2, 2024

(54) LAWN MOWER AND ASSOCIATED ATTACHMENT

(71) Applicant: TECHTRONIC CORDLESS GP, Anderson, SC (US)

(72) Inventor: David J. Baker, Easley, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 234 days.

(21) Appl. No.: 17/381,820

(22) Filed: Jul. 21, 2021

(65) Prior Publication Data

US 2023/0023352 A1   Jan. 26, 2023

(51) Int. Cl.
 *A01D 43/063* (2006.01)
 *A01D 101/00* (2006.01)

(52) U.S. Cl.
 CPC ..... *A01D 43/0635* (2013.01); *A01D 43/0638* (2013.01); *A01D 2101/00* (2013.01)

(58) Field of Classification Search
 CPC .............. A01D 43/063; A01D 43/0631; A01D 43/0635; A01D 43/0638; A01D 34/67
 USPC .................... 16/326, 327, 332, 362
 See application file for complete search history.

(56) References Cited

U.S. PATENT DOCUMENTS

| | | | | |
|---|---|---|---|---|
| 3,099,123 A | * | 7/1963 | Price | A01D 43/063 56/194 |
| 3,110,998 A | * | 11/1963 | Goldberg | A01D 43/063 56/202 |
| 3,408,801 A | * | 11/1968 | Kroll | A01D 43/063 56/199 |
| 3,872,656 A | * | 3/1975 | Dahl | A01D 43/0631 56/320.2 |
| 3,893,284 A | * | 7/1975 | Thon | A01D 43/0631 56/202 |
| 4,054,023 A | * | 10/1977 | Carpenter | A01D 43/063 248/219.2 |
| 4,149,362 A | | 4/1979 | Haffner | |
| 4,149,363 A | | 4/1979 | Woelffer | |
| 4,214,424 A | | 7/1980 | Gobin | |
| 4,306,408 A | | 12/1981 | Christopherson | |
| 4,566,257 A | * | 1/1986 | Akrabawi | A01D 43/0636 56/320.2 |

(Continued)

FOREIGN PATENT DOCUMENTS

| CN | 1823567 A | * | 8/2006 | ............ A01D 34/81 |
|---|---|---|---|---|
| CN | 203353174 U | | 12/2013 | |

(Continued)

OTHER PUBLICATIONS

Weid, EP-0318901-A1 Annotated version (Year: 1989).*

(Continued)

*Primary Examiner* — Alicia Torres
(74) *Attorney, Agent, or Firm* — Dority & Manning, P.A.

(57) ABSTRACT

Lawn mowers and attachments for lawn mowers are provided. An attachment includes a body including one or more sidewalls defining an internal volume configured to receive clippings from the lawn mower, wherein the body defines an opening; and a cover coupled to the body at the opening and moveable between an open position, whereby the opening is open, and a closed position, whereby the opening is closed, wherein the cover is selectively lockable in the open position, and wherein the cover is biased to the closed position by a spring.

20 Claims, 6 Drawing Sheets

(56) References Cited

U.S. PATENT DOCUMENTS

| | | | | |
|---|---|---|---|---|
| 4,693,064 A | * | 9/1987 | Katayama | A01D 43/063 56/202 |
| 4,702,063 A | | 10/1987 | Satoh | |
| 4,800,712 A | * | 1/1989 | Morse | A01D 43/0631 56/16.6 |
| 4,907,403 A | * | 3/1990 | Jones | A01D 43/0635 56/16.6 |
| 5,794,425 A | | 8/1998 | Thomason | |
| 5,845,473 A | | 12/1998 | Hopkins | |
| 6,840,029 B2 | | 1/2005 | Ishimori | |
| 6,931,827 B2 | | 8/2005 | Komorida | |
| 6,996,963 B2 | | 2/2006 | Peter | |
| 7,013,627 B2 | | 3/2006 | Hebbard | |
| 7,185,478 B1 | | 3/2007 | Willis, II | |
| 7,806,593 B2 | | 10/2010 | Toporski | |
| 8,033,086 B2 | | 10/2011 | Fukumoto | |
| 9,084,393 B1 | * | 7/2015 | Singleton | A01D 43/0636 |
| 10,624,265 B2 | | 4/2020 | Volovsek | |
| 10,721,866 B2 | * | 7/2020 | Baker | A01D 43/0635 |
| 2005/0055994 A1 | * | 3/2005 | Hebbard | A01D 43/063 56/202 |
| 2005/0109002 A1 | * | 5/2005 | Peter | A01D 43/063 56/202 |
| 2011/0197559 A1 | | 8/2011 | Birch | |
| 2021/0251143 A1 | * | 8/2021 | Gaeddert | A01D 34/71 |

FOREIGN PATENT DOCUMENTS

| | | | | |
|---|---|---|---|---|
| CN | 203467222 U | | 3/2014 | |
| CN | 203597086 U | | 5/2014 | |
| CN | 106717494 A | | 5/2017 | |
| CN | 104871719 B | | 8/2017 | |
| CN | 206506880 U | | 9/2017 | |
| CN | 207573941 U | | 7/2018 | |
| CN | 208874860 U | | 5/2019 | |
| DE | 1812908 A1 | | 8/1969 | |
| DE | 1582482 A1 | * | 6/1970 | A01D 43/063 |
| DE | 3328081 C | * | 3/1984 | A01D 43/0635 |
| DE | 20021721 U1 | * | 4/2001 | A01D 43/0635 |
| EP | 0009774 A1 | * | 4/1980 | A01D 34/81 |
| EP | 47415 A1 | | 3/1982 | |
| EP | 318901 B1 | | 12/1991 | |
| EP | 1304027 B1 | | 2/2007 | |
| EP | 3469879 B1 | | 10/2020 | |
| FR | 2703211 A1 | * | 10/1994 | A01D 43/0635 |
| FR | 2715021 A1 | * | 7/1995 | A01D 43/063 |
| GB | 892309 A | | 3/1962 | |
| GB | 2395884 A | * | 6/2004 | A01D 43/0635 |
| GB | 2429624 A | * | 3/2007 | A01D 43/063 |

OTHER PUBLICATIONS

Coulanges, FR-2715021-A1 (Year: 1995).*
Keith Parker, CN-1823567-A, Translation (Year: 2006).*
Ni, CN-203467222-U Translation Annotated (Year: 2014).*
European Search Report Corresponding with Application No. EP22185403 dated Nov. 30, 2022 (2 pages).

* cited by examiner

LAWN MOWER AND ASSOCIATED ATTACHMENT

FIELD

The present disclosure relates generally to lawn mowers, and more particularly to attachments for lawn mowers.

BACKGROUND

Lawn mowers are generally utilized in grass cutting operations. However, they may also be used in other operations, such as picking up of leaves and other debris. When in use, lawn mowers generally discharge debris from a mower deck. Many operators discharge this debris from the mower deck after the debris has been cut down into finer-sized particles. Other operators prefer to collect the debris and remove it from their yards. Removing debris requires operators to move and empty loaded containers which are heavy.

Accordingly, improved systems, devices, and methods of removing debris are desired in the art.

BRIEF DESCRIPTION

Aspects and advantages of the invention in accordance with the present disclosure will be set forth in part in the following description, or may be obvious from the description, or may be learned through practice of the technology.

In accordance with one embodiment, an attachment for a push lawn mower is provided. The attachment includes a body including one or more sidewalls defining an internal volume configured to receive clippings from the lawn mower, wherein the body defines an opening; and a cover coupled to the body at the opening and movable between an open position, whereby the opening is open, and a closed position, whereby the opening is closed, wherein the cover is selectively lockable in the open position, and wherein the cover is biased to the closed position by a spring.

In accordance with another embodiment, a lawn mower is provided. The lawn mower includes a mower deck defining a cutting area; a cutting implement disposed in the cutting area; a debris egress location in communication with the cutting area; and an attachment comprising: a body including one or more sidewalls defining an internal volume configured to receive clippings from the lawn mower, wherein the body defines an opening configured to be disposed at the debris egress location; and a cover coupled to the body at the opening and movable between an open position, whereby the opening is open, and a closed position, whereby the opening is closed, wherein the cover comprises an opening configured to be in open communication with the debris egress location of the lawn mower.

In accordance with another embodiment, a method of using an attachment with a lawn mower is provided. The method includes removing the attachment from the lawn mower, the attachment having a cover disposed at, and configured to selectively close, an opening of a body of the attachment, wherein the cover is in a closed position whereby the opening is closed; reconfiguring the cover to an open position by pivoting the cover from the closed position; removing material from an internal volume of the attachment through the opening; reconfiguring the cover to the closed position; and attaching the attachment to the lawn mower such that the cover is in communication with a debris egress location of the lawn mower.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
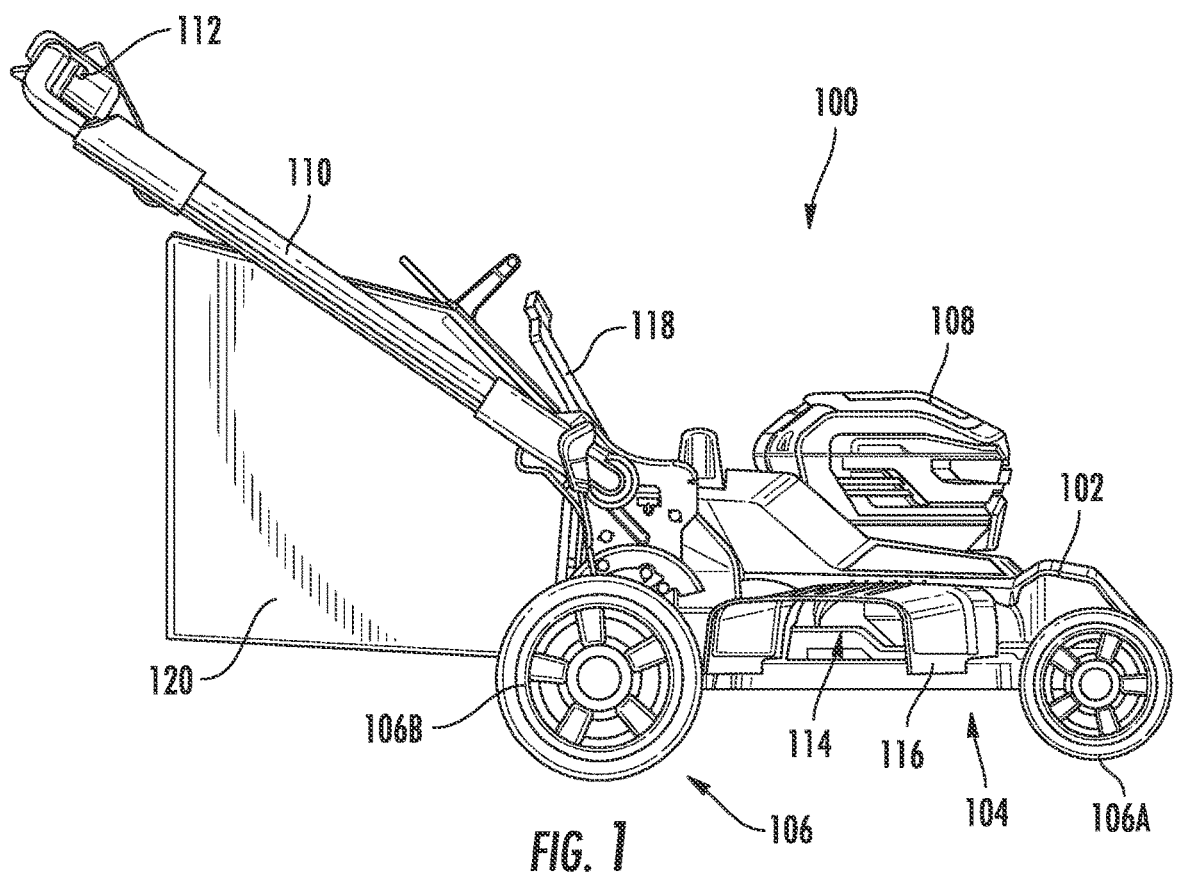
FIG. 1 is a side view of a lawn mower in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Reference made herein to lawn mowers is intended to refer generally to power tools having cutting implements used in cutting lawn, and more particularly to riding and push lawn mowers, and yet more particularly to push lawn mowers. The push lawn mowers described herein may be powered by one or more power sources, e.g., batteries and one or more electric motors, or operate manually, i.e., by application of a human-provided motive force.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, lawn mowers can include attachments which collect debris and clippings ejected from a cutting area of the lawn mower. The attachment can include an opening through which the debris and clippings can be received from the cutting area and through which the debris and clippings can be emptied. The opening can be selectively covered by a cover that is lockable in an open position. The attachment can be utilized on a plurality of different types of lawn mowers. The attachment can include a plurality of different attachment protocol configured to allow an operator to attach the attachment to the different types of lawn mowers.

Figure 2:
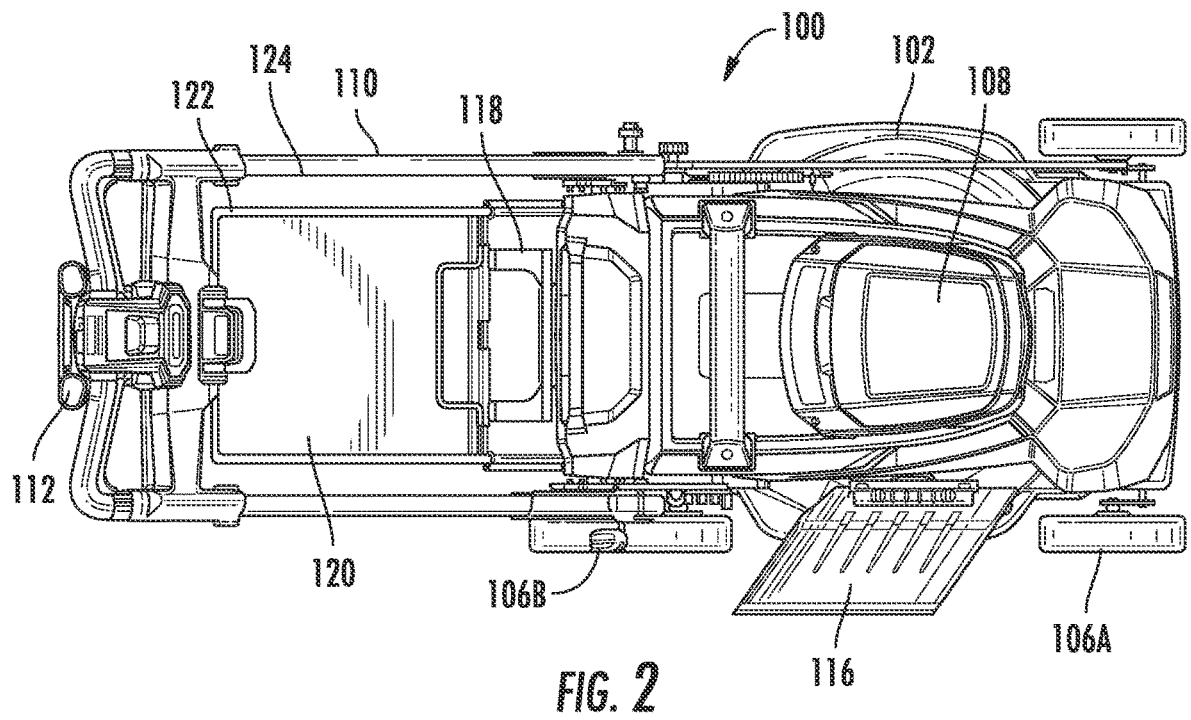
FIG. 2 is a top view of a lawn mower in accordance with embodiments of the present disclosure.

Referring now to the drawings, FIG. 1 illustrates a side view of a lawn mower 100 in accordance with an exemplary embodiment of the present disclosure. FIG. 2 illustrates a top view of the lawn mower 100 in accordance with an exemplary embodiment of the present disclosure. The lawn mower 100 depicted in FIGS. 1 and 2 is electrically powered using one or more batteries in electrical communication with one or more motors configured to receive power from the one or more batteries and power the lawn mower 100. However, it should be understood that in accordance with another embodiment, the lawn mower 100 may be powered by an alternate power source. For instance, the lawn mower 100 may receive power through an electrical cord plugged into a power source, e.g., a wall outlet. Alternatively, or in addition thereto, the lawn mower 100 may be powered by one or more internal combustion (IC) engines. Furthermore, while the lawn mower 100 depicted in FIGS. 1 and 2 is a powered push mower, in other instances the lawn mower 100 can be a manually powered push mower, i.e., powered by human-provided motive force.

The lawn mower 100 can generally include a mower deck 102 defining a cutting area 104. The cutting area 104 can be disposed below the mower deck 102. The mower deck 102 may have sidewalls that extend downward and surround the cutting area 104. A cutting implement (not illustrated) can be disposed at the cutting area 104. The cutting implement may be driven, e.g., rotatably driven, to incur a cutting operation on underlying medium, e.g., grass.

The cutting deck 102 can be supported by one or more traction elements configured to interface with the underlying medium and movably support the lawn mower 100. The depicted traction elements include wheels 106. In the depicted embodiment, the wheels 106 include a pair of front wheels 106A and a pair of rear wheels 106B. In certain instances, the front and rear wheels 106A and 106B can define different characteristics as compared to one another. For example, the rear wheels can 106B can be larger than the front wheels 106A.

In an embodiment, the wheels 106 can be driven by one or more motors (not illustrated). The cutting implement can similarly be driven by one or more motors (not illustrated). The motors can receive electrical power from one or more batteries disposed in a battery housing 108. In certain instances, the batteries can be removable from the battery housing 108. In other instances, the batteries can be fixed in the battery housing 108. By way of non-limiting example, the batteries can include lithium-ion batteries.

The lawn mower 100 can further include a handle 110 extending rearward and upward from the mower deck 102. In certain instances, the handle 110 can be adjustable relative to the mower deck 102. For example, the handle 110 can be pivotable relative to the mower deck 102, telescopic relative to the mower deck 102, or both. In an embodiment, the handle 110 can include a user interface 112 configured to permit an operator to adjust one or more operating parameters of the lawn mower 100, e.g., to turn on and off the lawn mower 100, to engage a self-propel function of the lawn mower, to release the handle 110 to move between different alignments or positions, a bail to prevent accidental propulsion of the lawn mower 100, a speed adjusting interface, another similar control, or any combination thereof.

As previously described, the lawn mower 100 defines the cutting area 104 where the cutting operation is performed by the cutting implement. The cutting area 104 can define a debris egress location 114. The debris egress location 114 can be located, e.g., at a side of the mower deck 102. The debris egress location 114 can generally include a passageway configured to allow egress of debris, e.g., clippings, from the cutting area 104 so as to prevent clogging of debris within the cutting area 104 and to distribute the debris more evenly over neighboring terrain. In the depicted illustration, the debris egress location 114 includes a chute 116 configured to guide the debris out of the debris egress location 114 and prevent debris from discharging in all directions. The chute 116 may further provide protection to the operator and any nearby people against flying debris which might cause bodily injury or damage.

In the illustrated embodiment, the debris egress location 114 is defined by an entirely closed opening, i.e., an opening having all sides defined by the mower deck 102. In another embodiment, the debris egress location 114 can be only partially defined by the mower deck 102 and include, e.g., an open bottom.

While not illustrated, the mower deck 102 can include another debris egress location located at a different position than the debris egress location 114. In a particular embodiment, the other debris egress location can be disposed at a rear end of the mower deck 102. More particularly, the other debris egress location can extend through the sidewall of the mower deck 102 at the rear of the mower deck 102. Unless states otherwise, reference made hereinafter to the debris egress location is intended to refer to the debris egress location disposed at the rear of the mower deck 102.

The debris egress location may be selectively closable. For instance, the lawn mower 100 can include a cover 118 configured to close the debris egress location. The cover 118 can be moved between two or more positions, e.g., open and closed. In the closed position, the cover 118 can block the debris egress location. In this configuration, the lawn mower 100 may discharge debris through the debris egress location 114. This type of operation may be common when using the lawn mower 100 in cutting operations. However, in certain other operations, such as for example, when using the lawn mower to pick up leaves and larger debris, the debris egress location 114 may be closed and the cover 118 may be opened to reroute debris from the cutting area 104 through the debris egress location (not through debris egress location 114). It should be understood that in certain instances the debris egress location 114 may remain open while the cover 118 is also in the open position, thus allowing debris to exit the cutting area 104 through both debris egress locations.

The lawn mower 100 can further include an attachment 120 configured to be removably attached to the lawn mower 100, e.g., at or adjacent to the mower deck 102 or the handle 110.

Referring to FIG. 2, the attachment 120 can define a first size 122, as measured from a top view, that is less than a second size 124, as measured from the top view, of the handle 110. In an embodiment, the first and second sizes may refer to areal dimensions of the footprints of the attachment 120 and handle 110, respectively. The footprints may be mapped when the handle 110 and attachment 120 are both in the in-use configurations. Thus, the attachment 120 may be at least one of narrower or shorter than the handle 110. In this regard, the attachment 120 may not form an outer surface of the lawn mower 100 which might impact objects as the lawn mower 100 passes thereby.

Figure 3:
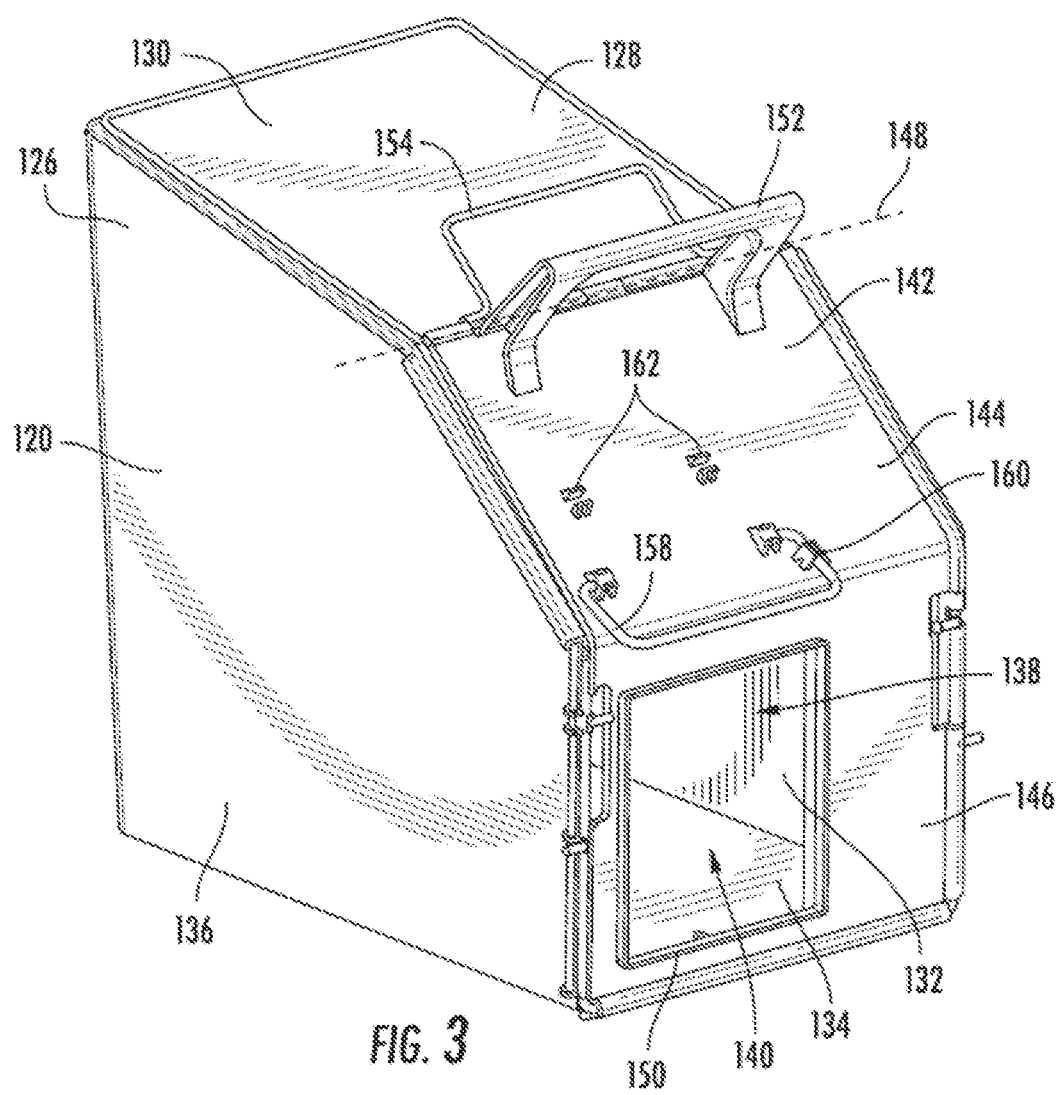
FIG. 3 is a perspective view of an attachment for the lawn mower in accordance with embodiments of the present disclosure as seen with a cover of the attachment in a closed position.

FIG. 3 illustrates a perspective view of the attachment 120 in accordance with an embodiment of the present disclosure, as seen removed from the lawn mower 100. The attachment 120 generally includes a body 126 having one or more sidewalls 128. In the depicted embodiment, the sidewalls 128 include a top sidewall 130, a left sidewall 132, a right sidewall 134, and a bottom sidewall 136. A back sidewall (not illustrated) can extend between the top, left, right, and bottom sidewalls 130, 132, 134, and 136.

The sidewalls 128 can generally define an internal volume 138 of the attachment 120. In certain instances, the shape of the internal volume 138 can generally correspond with the shape of the sidewalls 128. In an embodiment, the internal volume 138 can define a volume of at least 20 Liters (L), such as at least 25 L, such as at least 30 L, such as at least 40 L, such as at least 50 L, such as at least 60 L. As the internal volume 138 is configured to receive clippings and debris from the cutting area 102, the larger the internal volume 138, the greater volume of clippings can be received in the attachment 120 before the operator is required to empty the attachment 120. Conversely, however, the greater the volume of clippings contained in the attachment 120, the heavier the attachment 120. Thus, the attachment 120 includes features, described below, which facilitate easy removal of the attachment 120 from the lawn mower 100 and easy emptying of the clippings therefrom without accidently dropping clippings in undesirable locations.

The attachment 120 includes an opening 140 in the sidewall 128. The opening 140 is in fluid communication with the internal volume 138. The opening 140 may be located at a front end of the attachment 120. In a particular embodiment, the opening 140 may extend entirely between the top, left, right, and bottom sidewalls 130, 132, 134, and 136. In another embodiment, the opening 140 may include a plurality of openings disposed between the top, left, right, and bottom sidewalls 130, 132, 134, and 136. In the depicted embodiment, the left and right sidewalls 132 and 136 each include a sloped edge located between the forward and top sides of the attachment 120. In certain instances, the opening 140 can include a corresponding sloped edge and conform generally to the shape of the edges of the top, left, right, and bottom sidewalls 130, 132, 134, and 136.

In one or more embodiments, the body 126 can have a generally rigid construction. That is, for example, the body 126 can be formed from a material having a relatively stiff sidewall. Exemplary materials include one or more of metals, alloys, polymers, or the like. The body 126 can be configured to receive an internal element within the internal volume 138. The internal element can include, for example, a relatively non-rigid sidewall. Reference made to relative rigidity of the body 126 and the internal element is made with respect to the other of the body 126 and the internal element. That is, for example, the body 126 can be more rigid than the internal element. By way of non-limiting example, the internal element can include a fabric material having a relatively non-rigid sidewall. In certain embodiments, the internal element may be configured to conform, or generally conform, to the shape of the internal volume 138 of the body 126. The internal element may be attachable to the body 126 to, e.g., align the internal element and prevent movement with respect to the body 126.

A cover 142 can be coupled to the body 126. In a non-limiting embodiment, the cover 142 can include two or more segments, such as a first segment 144 and a second segment 146. In an embodiment, the first and second segments 144 and 146 may define generally planar shapes that intersect one another. In this regard, the cover 142 may accommodate embodiments of the lawn mower 100 where the left and right sidewalls 132 and 136 have sloped edges.

Figure 4:
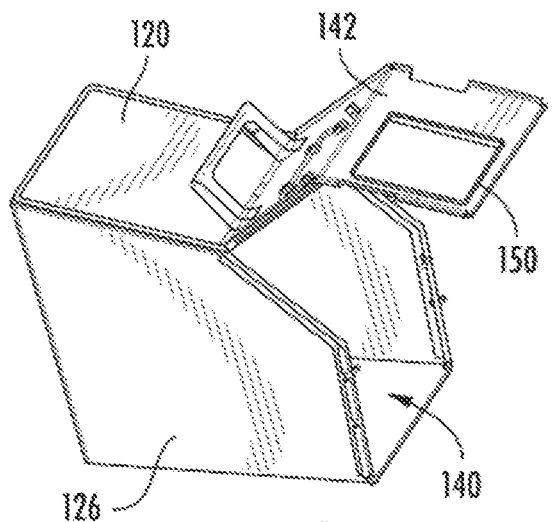
FIG. 4 is a perspective view of the attachment illustrated in FIG. 3 in accordance with embodiments of the present disclosure with the cover in an open position.
Figure 5:
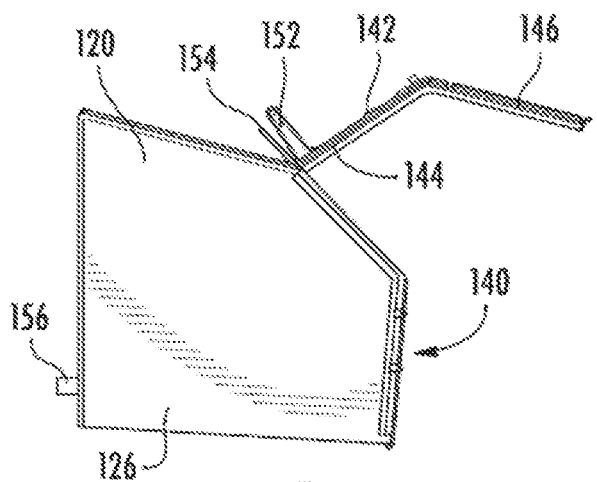
FIG. 5 is a side view of the attachment illustrated in FIG. 3 in accordance with embodiments of the present disclosure with the cover in the open position.

The cover 142 may be disposed at the opening 140 and be moved between a closed position, as illustrated in FIG. 3, and an open position, as illustrated in FIGS. 4 and 5. In the closed position, the cover 142 can close the opening 140 such that the opening 140 is closed. In the open position, the cover 142 can be displaced from the opening 140 such that the opening 140 is open. By way of example, the cover 142 may be moved between the open and closed positions through a rotational movement, e.g., pivoting. For instance, the cover 142 may be pivotably coupled to the body 126 at an upper location of the cover 142. The cover 142 may pivot about a pivot axis 148 that extends parallel, or generally parallel, with the top sidewall 130.

In an embodiment, the cover 142 may be configured to pivot between the open and closed positions up to a maximum deflection angle of at least 10 degrees, such as at least 20 degrees, such as at least 30 degrees, such as at least 40 degrees, such as at least 50 degrees, such as at least 60 degrees, such as at least 70 degrees, such as at least 80 degrees, such as at least 90 degrees.

In certain instances, and as described in greater detail hereinafter, in addition to pivotable movement between the closed and open positions, the cover 142 can have at least one additional degree of freedom (DOF) associated with moving the cover 142 between the closed and open positions. As used herein, the additional DOF is intended to refer to another movement pattern that occurs when the cover 142 is moved between the closed and open positions. For example, in addition to pivoting on the pivot axis 148, the cover 142 can translate during reconfiguration between the closed and open positions. For instance, the cover 142 may translate in a direction generally radial to the pivot axis 148. As described hereinafter, such translation may, e.g., allow the cover 142 to be selectively locked, i.e., retained, in the open position.

As described in greater detail hereinafter, the cover 142 can be selectively lockable in the open position. In this regard, the operator can open the cover 142 and selectively retain the cover 142 in the open position. Retention of the cover 142 in the open position may be particularly advantageous when the operator is emptying a large volume of debris from the attachment 120. With the attachment 120 at a suitable emptying location, the operator can open the cover 142 and lock the cover 142 to permit easier emptying of the internal volume 138 without the cover being subjected to gravitational forces (or other forces) which might tend to cause the cover 142 to close.

In one or more embodiments, the cover 142 may automatically return to the closed position. For example, the cover 142 may be biased to the closed position. For instance, the cover 142 may be rotatably biased by a biasing element. By way of non-limiting example, the biasing element may include a spring, such as a torsion spring. The biasing element can rotationally bias the cover 142 to pivot towards the closed position.

The cover 142 may further include an opening 150. The opening 150 may extend through the cover 142. The opening 150 can define an areal size less than an areal size of the cover 142. In an embodiment, a ratio of the areal size of the opening 150 to the areal size of the cover 142 [$A_{OPENING}$: $A_{COVER}$] is in a range of 1:100 and 1:1.25, such as in a range of 1:2 and 1:25, such as in a range of 1:3 and 1:10, such as in a range of 1:4 and 1:8.

In an embodiment, the areal size of the opening 150 is within +/−50% of an areal size of an opening of the debris egress location of the cutting area 104, such as within +/−25% of the areal size of the opening of the debris egress location, such as within +/−10% of the areal size of the opening of the debris egress location. In a particular embodiment, the areal size of the opening 150 can be equal to the areal size of the opening of the debris egress location of the cutting area 104.

As illustrated, the opening 150 is laterally offset from a centerline of the attachment 120. In certain instances, the opening 150 can be laterally offset from the centerline by a same distance of offset as the debris egress location. In this regard, the opening 150 can receive the debris discharged from the debris egress location.

In the illustrated embodiment, the opening 150 is disposed in the second segment 146 of the cover 142. However, it should be understood that the opening 150 can be disposed in another segment of the cover 142, or extend over a plurality of the segments, as long as the opening 150 is in open communication with the debris egress location of the cutting area 104 when the attachment 120 is attached to the lawn mower 100.

In an embodiment, the cover 142 includes a handle 152. In certain instances, the handle 152 can extend from the first segment 144. In the embodiment in FIG. 5, the handle 152 extends from the first segment 144 at an approximately 90 degree angle. In another embodiment, the handle 152 can be canted, i.e., angularly offset, from the first segment 144. In another embodiment, the handle 152 can be coupled to a different portion of the cover 142, such as the second segment 146.

In use, the operator may grab the cover 142 so as to reconfigure the cover 142 by grabbing the handle 152. In certain instances, the cover 142 may be lockable in the closed position. In at least these embodiments, the attachment 120 may be lifted by the handle 152 without debris emptying through the opening 140. In all embodiments having the handle 152, the operator may utilize the handle 152 at least for reconfiguring the cover 142 so as to allow emptying of the debris and clippings from the internal volume 138 of the attachment 120.

A secondary handle 154 may be coupled to the attachment 120. The secondary handle 154 may permit the operator to grab the attachment 120 without opening the cover 142, particularly in embodiments where the cover 142 does not lock in the closed position.

In an embodiment, the secondary handle 154 can be relatively fixed with respect to the body 126 of the attachment 120. In this regard, the secondary handle 154 can maintain a fixed angle and location relative to the body 126. In another embodiment, the secondary handle 154 may have at least one degree of freedom, as measured relative to the body 126. For instance, the secondary handle 154 may be rotatable or pivotable. When stored, the secondary handle 154 may rest flat against the top sidewall 130 of the attachment 120. When the operator wishes to lift the attachment, the operator can rotate the secondary handle 154 to a suitable position for grasping.

In one embodiment, the secondary handle 154 may perform a secondary function, such as for example, forming an attachment protocol between the attachment 120 and another portion of the lawn mower 100. For instance, the handle 110 can include a member, such as a hook, which extends downward to receive the secondary handle 154 when the attachment is attached to the lawn mower 100. In an embodiment, the secondary handle 154 can form at least a portion of the lockable structure to which the cover 142, and more particularly the handle 152, can lock with when the cover 142 is locked in the open position.

A tertiary handle 156 may be further associated with the attachment 120 and configured to permit easier handling of the attachment 120, particularly when the attachment 120 is full of clippings and debris.

Referring again to FIG. 3, in one or more embodiments, the attachment 120 may include an attachment protocol 158 configured to interface with the lawn mower 100 so as to retain the attachment 120 coupled at a relatively fixed position with respect to the lawn mower 100. In the depicted embodiment, the attachment protocol 158 includes a relatively rigid structure movably connected to the cover 142. By way of non-limiting example, the attachment protocol 158 can include a hinged bar that can pivot relative to the cover 142. A retention interface 160 may selectively retain the attachment protocol 158 in at least one in-use configuration (as illustrated in FIG. 3). By way of non-limiting example, the retention interface 160 may include a channel having a narrowed entrance into which the attachment protocol 158 is insertable. After passing through the narrowed entrance, the attachment protocol 158 can be held at one or more prescribed positions suitable for mounting the attachment 120 to the lawn mower 100. The attachment 120 can further include a storage interface 162 configured to store the attachment protocol 158 when not in use. Similar to the retention interface 160, the storage interface 162 can include a channel having a narrowed entrance through which the attachment protocol 158 can pass through to transition between the stored and in-use configurations. In the illustrated embodiment, the storage interface 162 includes two storage interfaces. In other embodiments, the storage interface 162 can include any number of storage interface locations. The storage interface 162 can maintain the attachment protocol 158 at a desired location when storing the attachment protocol 158. In certain instances, the operator may move the attachment protocol 158 to the stored configuration such that the attachment protocol 158 is engaged with the storage interface 162 prior to emptying the attachment 120. In this regard, the attachment protocol 158 is positively retained and prevented from undesirably flapping around or even hitting the cover 142.

Figure 6:
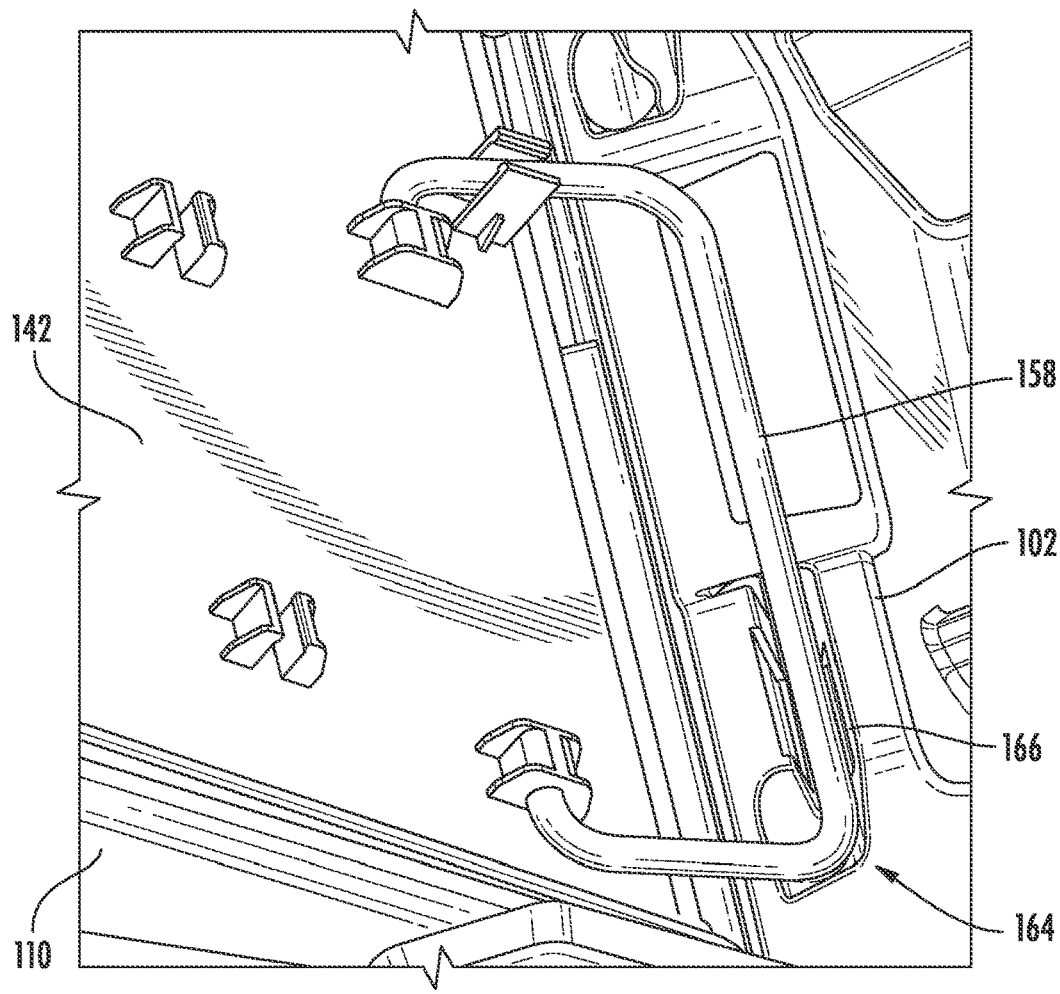
FIG. 6 is a partial perspective view of a lawn mower in accordance with embodiments of the present disclosure as seen at an interface between the attachment and the lawn mower.
Figure 7:
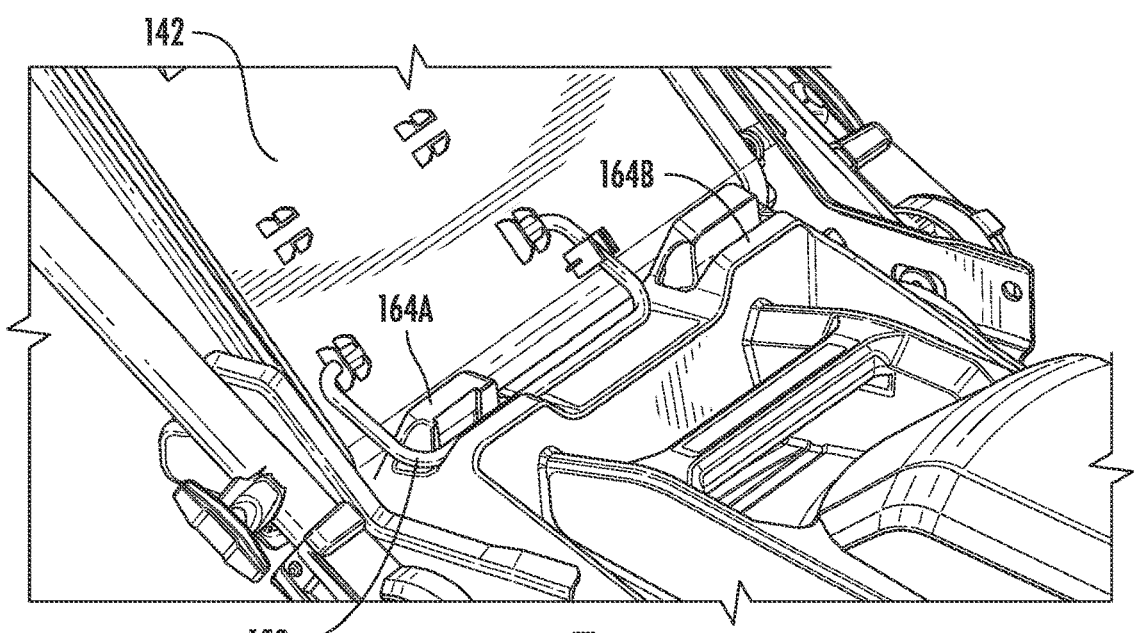
FIG. 7 is a partial perspective view of a lawn mower in accordance with embodiments of the present disclosure as seen at an interface between the attachment and the lawn mower.

FIGS. 6 and 7 illustrate the attachment protocol 158 engaged with a mating interface 164 of the lawn mower 100. The mating interface 164 depicted in FIGS. 6 and 7 includes a channel 166 extending into a surface of the lawn mower 100, such as a surface of the mower deck 102. The channel 166 can define a shape configured to receive the attachment protocol 158. Once in the channel 166, the attachment protocol 158 may be retained in the channel 166 by a retention feature including, for example, any one or more of a lip, a restricted/narrowed portion, a latch or cover, a detent, or another retention mechanism. In certain instances, the attachment protocol 158 may interface with the channel 166 only when the attachment protocol 158 is oriented at a prescribed condition or within a prescribed range of conditions, such as within a certain angular displacement with respect to the channel 166.

In certain instances, the lawn mower 100 may include a plurality of mating interfaces 164, such as a first mating interface 164A and a second mating interface 164B. The first and second mating interfaces 164A and 164B can be spaced apart from one another or share at least one common feature. Each of the plurality of mating interfaces 164 can be disposed along the lawn mower 100 at a position to correspond with different types of attachment protocol 158 or to accommodate moveable attachment protocol 158 (e.g., where the attachment protocol 158 is repositionable relative, e.g., to the cover 142).

Figure 8:
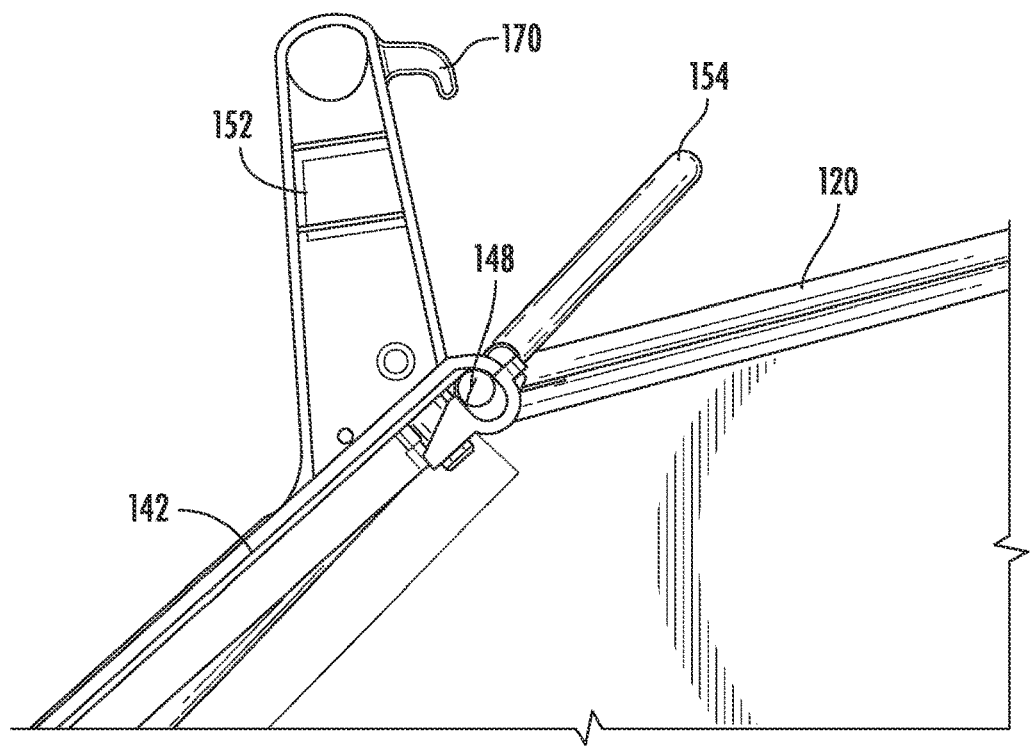
FIG. 8 is a side view of the attachment in accordance with embodiments of the present disclosure as seen in the closed position.
Figure 9:
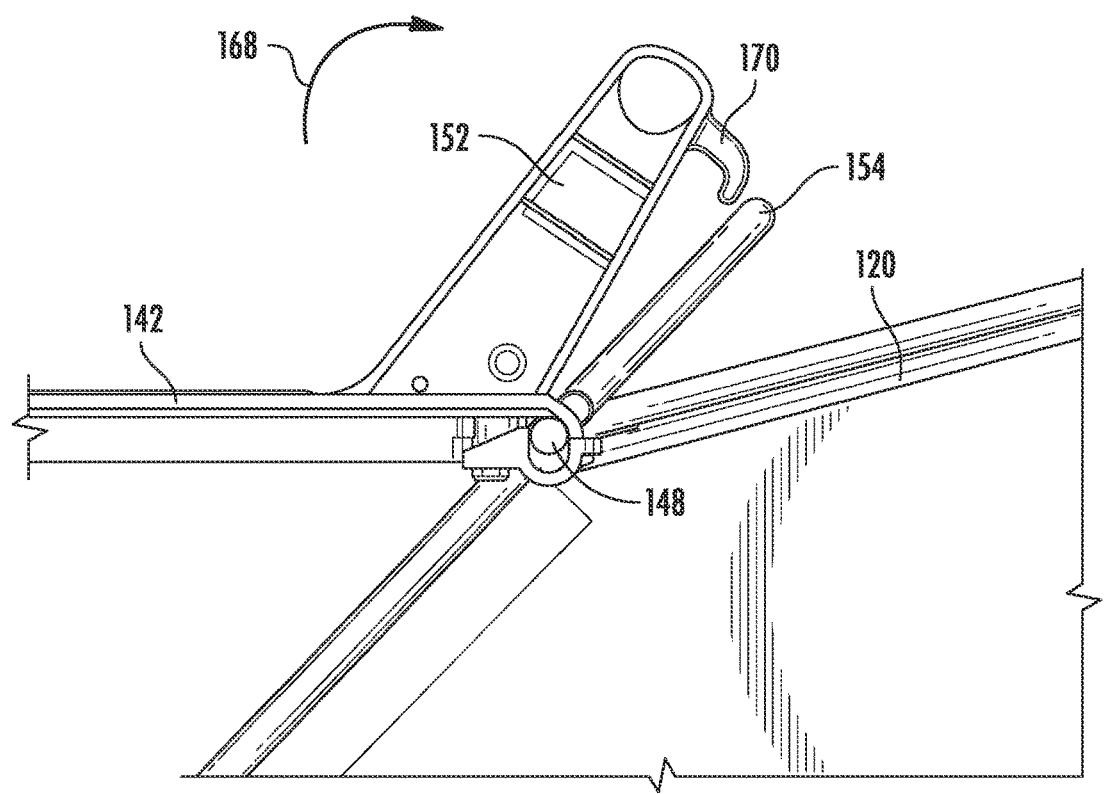
FIG. 9 is a side view of the attachment in accordance with embodiments of the present disclosure as seen during reconfiguring between the closed position and an open position.

FIGS. 8 to 12 illustrate side views of the cover 142 in various positions as seen between a closed orientation and an open orientation. For instance, FIG. 8 illustrates the cover 142 in a closed orientation whereby the opening 140 of the attachment 120 is closed. FIG. 9 illustrates the cover 142 displaced from the closed orientation in a direction towards a fully open orientation. In the embodiment depicted in FIG. 9, the cover 142 is pivoted about the pivot axis 148 from the orientation depicted in FIG. 8 in a direction corresponding with arrow 168.

Figure 10:
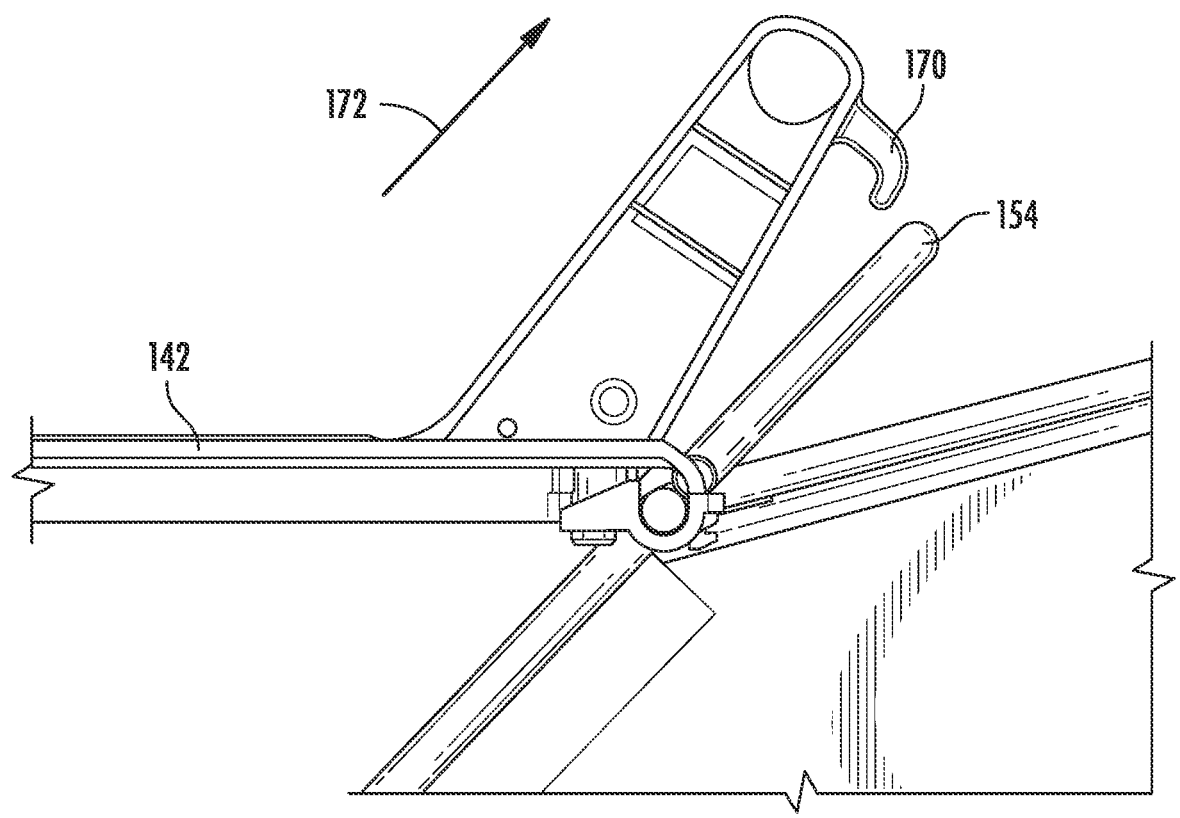
FIG. 10 is a side view of the attachment in accordance with embodiments of the present disclosure as seen during reconfiguring between the closed position and an open position.
Figure 11:
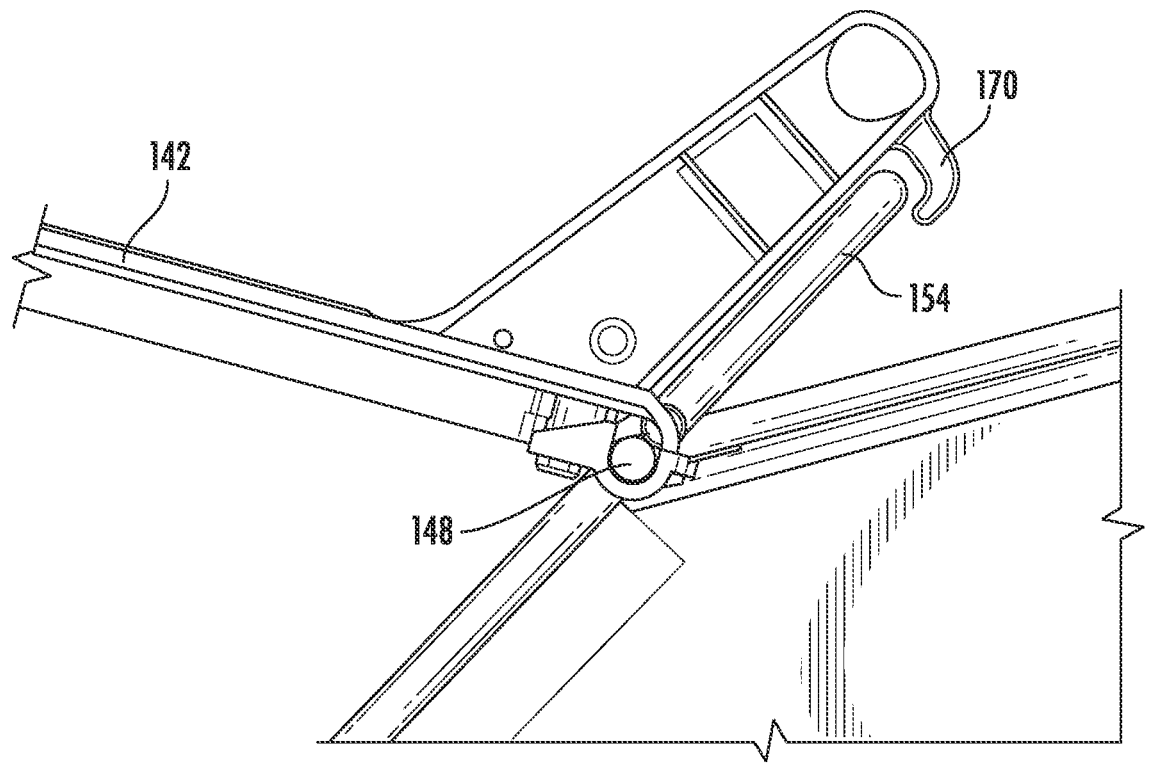
FIG. 11 is a side view of the attachment in accordance with embodiments of the present disclosure as seen during reconfiguring between the closed position and an open position.
Figure 12:
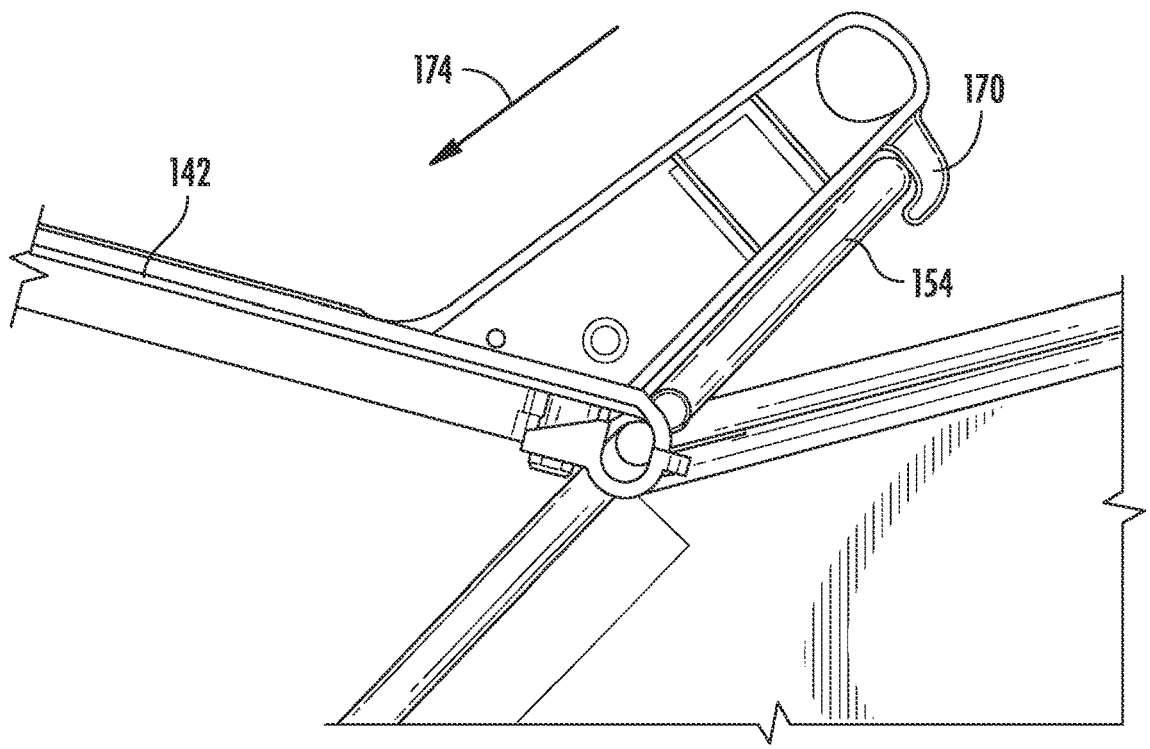
FIG. 12 is a side view of the attachment in accordance with embodiments of the present disclosure as seen in the open position.

In one or more embodiments, the handle 152 can include a locking interface 170 configured to interface with a complementary locking interface, such as the secondary handle 154, to selectively lock the cover 142 in the open orientation. FIGS. 10 to 12 illustrate an exemplary operation to selectively lock the locking interface 170 with the secondary handle 154. It should be understood that other operations are contemplated herein without departing from the invention. For instance, the locking interface 170 may be receivable within a gated opening. The gated opening can include a selectively movable latch which can move to permit entrance of the locking interface 170 into the opening. Upon insertion into the opening, the movable latch can be closed. Unlike the embodiment depicted in FIGS. 8 to 12, the gated opening may allow the operator to lock the cover 142 in the open orientation without requiring a second degree of freedom.

However, in the illustrated embodiment, the operation of locking the cover 142 includes moving the cover 142 in a manner including a second degree of freedom in addition to rotating the cover 142 about the pivot axis 148. That is, referring to FIGS. 9 to 11, the cover 142 may be moved in a manner other than the aforementioned rotation about the pivot axis 148. In the embodiment depicted in FIGS. 9 to 11, the cover is prepared to engage with the secondary handle 154 through a translational movement. More particularly, the cover 142 is translated in a direction generally along arrowed line 172 (FIG. 10). The cover 142 can be translated in the direction of the arrowed line 172 a distance sufficient to allow the locking interface 170 to align with the secondary handle 154. That is, the cover 142 can be translated until the locking interface 170 passes the secondary handle 154.

Referring to FIG. 11, after the locking interface 170 is correctly aligned, the cover 142 can be pivoted, e.g., about pivot axis 148 (which may now be displaced in the direction of the arrowed line 172), until the locking interface 170 is aligned (e.g., overlaps) with the secondary handle 154. After the alignment between the locking interface 170 and secondary handle 154 is completed, the cover 142 can be translated in a direction generally along arrowed line 174 (FIG. 12). More particularly, the cover 142 is translated in the direction of the arrowed line 174 a distance sufficient to allow the locking interface 170 to selectively lock with the secondary handle 154. At this point, the cover 142 is locked in the open orientation and the operator can empty the attachment 120 through the opening 140.

In certain instances, the cover 142 can be reoriented to the closed orientation using the reverse operation described above with respect to FIGS. 8 to 12. In other instances, the cover 142 may be oriented to the closed orientation using a different operation than that described above with respect to FIGS. 8 to 12. For example, the operation of closing the cover 142 may include use of latches, switches, rotational cams or mechanism, or the like which was not required in the original opening operation.

It should be understood that in certain instances the operator may empty the attachment 120 without locking the cover 142 in the open orientation. That is, the cover 142 can be rotated open without being positively locked in the open orientation. In one or more embodiments, the cover 142 can be maintained in the closed orientation by engagement of the attachment 120 with the lawn mower 100. That is, the cover 142 may be prohibited from rotating to the open orientation by one or more features of the lawn mower 100 which restrict movement of the cover 142 when the cover 142 is engaged with the lawn mower 100.

Figure 13:
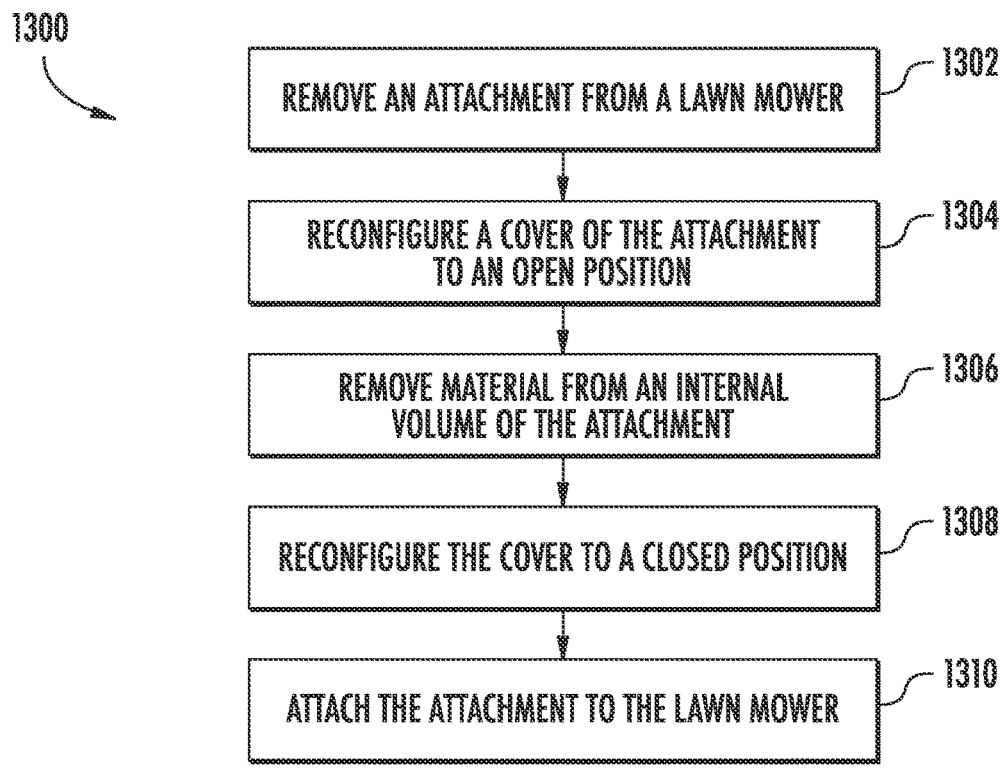
FIG. 13 is a flow chart of a method of using an attachment with a lawn mower in accordance with embodiments of the present disclosure.

FIG. 13 illustrates an exemplary method 1300 of using an attachment with a lawn mower. The method 1300 generally includes a step 1302 of removing the attachment from the lawn mower. The step 1302 of removing the attachment may be performed, for example, by uncoupling one or more attachment protocol of the attachment from a mating interface of the lawn mower. With the attachment removed, the method 1300 can include a step 1304 of reconfiguring a cover of the attachment to an open position. In an embodiment, the step 1304 of reconfiguring the cover can be performed using a single degree of freedom (e.g., rotation of the cover). In another embodiment, the step 1304 of reconfiguring the cover can include a plurality of degrees of freedom, such as two degrees of freedom. For instance, as described above, by way of non-limiting example, the step 1304 of reconfiguring the cover can include both a rotational movement and a translational movement. The rotational and translational movements can occur, e.g., successively, simultaneously, or both.

The method 1300 can further include a step 1306 of removing material from an internal volume of the attachment. In certain instances, the step 1306 can be performed after locking the cover in the open position. Locking the cover can be performed after step 1304, during step 1304, or prior to step 1306. In an embodiment, emptying the attachment can include emptying material through the same opening used to fill the attachment. In a more particular embodiment, emptying the attachment may be performed using an entire size of the opening while filling the attachment can be performed using only a portion of the opening (e.g., the filling opening can be smaller than the total size of the opening such as described with respect to the openings 140 and 150).

The method 1300 can further include a step 1308 of reconfiguring the cover to a closed position. The step 1308 can include unlocking the cover from the locked position. With the cover in the closed position, the method 1300 can further include a step 1310 of attaching the attachment to the lawn mower. In this regard, the attachment may be emptied and reattached for collection of debris and other materials.

Systems, devices, and methods described in accordance with embodiments herein may allow for collection of material (e.g., debris, clippings, etc) during operation of the lawn mower while offering easy and quick emptying and operational use.

Further aspects of the invention are provided by one or more of the following embodiments:

Embodiment 1. An attachment for a push lawn mower, the attachment comprising: a body including one or more sidewalls defining an internal volume configured to receive clippings from the lawn mower, wherein the body defines an opening; and a cover coupled to the body at the opening and movable between an open position, whereby the opening is open, and a closed position, whereby the opening is closed, wherein the cover is selectively lockable in the open position, and wherein the cover is biased to the closed position by a spring.

Embodiment 2. The attachment of claim 1, wherein the body comprises a rigid construction, and wherein the attachment further comprises a bag insertable into the internal volume and configured to receive the clippings.

Embodiment 3. The attachment of claim 1, wherein the cover comprises an opening configured to be in open communication with a debris egress location of the lawn mower.

Embodiment 4. The attachment of claim 1, wherein the cover is pivotably coupled to the body and configured to pivot between the open and closed positions, and wherein the cover has at least one additional degree of freedom associated with pivoting between the open and closed positions.

Embodiment 5. The attachment of claim 1, wherein the attachment comprises an attachment protocol associated with attaching the attachment to the lawn mower, and wherein the attachment protocol is configured to attach to a plurality of different types of lawn mowers.

Embodiment 6. The attachment of claim 5, wherein the attachment protocol is moveable between a stored configuration and an in-use configuration.

Embodiment 7. The attachment of claim 1, wherein the attachment is removably attachable to the lawn mower, and wherein the cover is in the closed position when the attachment is attached to the lawn mower.

Embodiment 8. A lawn mower comprising: a mower deck defining a cutting area; a cutting implement disposed in the cutting area; a debris egress location in communication with the cutting area; an attachment comprising: a body including one or more sidewalls defining an internal volume configured to receive clippings from the lawn mower, wherein the body defines an opening configured to be disposed at the debris egress location; a cover coupled to the body at the opening and moveable between an open position, whereby the opening is open, and a closed position, whereby the opening is closed, wherein the cover comprises an opening configured to be in open communication with the debris egress location of the lawn mower.

Embodiment 9. The lawn mower of claim 8, wherein the attachment is configured to receive clippings from the cutting area when the cover is in the closed position.

Embodiment 10. The lawn mower of claim 8, wherein the cover is spring biased to the closed position and selectively lockable in the open position.

Embodiment 11. The lawn mower of claim 8, wherein the attachment is removably attachable to the lawn mower, and wherein the cover is in the closed position when the attachment is attached to the lawn mower.

Embodiment 12. The lawn mower of claim 8, wherein the attachment is configurable between two or more different lawn mowers, each of the two or more different lawn mowers having a different attachment protocol associated with attaching the attachment to the lawn mower.

Embodiment 13. The lawn mower of claim 8, wherein the body comprises a rigid construction, and wherein the attachment further comprises a bag insertable into the internal volume and configured to receive the clippings.

Embodiment 14. The lawn mower of claim 8, wherein the cover is pivotably coupled to the body and configured to pivot between the open and closed positions, and wherein the cover has at least one additional degree of freedom associated with pivoting between the open and closed positions.

Embodiment 15. The lawn mower of claim 8, wherein the attachment defines a first size, as measured from a top view, that is less than a second size, as measured from the top view, of the handle.

Embodiment 16. A method of using an attachment with a lawn mower, the method comprising: removing the attachment from the lawn mower, the attachment having a cover disposed at, and configured to selectively close, an opening of a body of the attachment, wherein the cover is in a closed position whereby the opening is closed; reconfiguring the cover to an open position by pivoting the cover from the closed position; removing material from an internal volume of the attachment through the opening; reconfiguring the cover to the closed position; and attaching the attachment to the lawn mower such that the cover is in communication with a debris egress location of the lawn mower.

Embodiment 17. The method of claim 16, further comprising operating the lawn mower such that material is introduced into the attachment from the debris egress location of the lawn mower through an opening in the cover.

Embodiment 18. The method of claim 16, wherein reconfiguring the cover to the open position comprises locking the cover in the open position prior to removing material from the internal volume of the attachment.

Embodiment 19. The method of claim 16, wherein removing the attachment from the lawn mower comprises removing the attachment from a first type of lawn mower, wherein attaching the attachment to the lawn mower comprises attaching the attachment to a second type of lawn mower, and wherein the first and second types of lawn mowers are different from one another.

Embodiment 20. The method of claim 16, wherein attaching the attachment to the lawn mower includes moving an attachment protocol from a stored configuration to an in-use configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An attachment for a push lawn mower, the attachment comprising:
    a body including one or more sidewalls defining an internal volume configured to receive clippings from the lawn mower, wherein the body defines an opening; and
    a cover pivotably coupled to the body at the opening between an open position, whereby the opening is open, and a closed position, whereby the opening is closed, wherein the cover is selectively lockable in the open position by translating the cover in a first direction until a locking interface of the cover passes a complementary locking interface and then translating the cover in a second direction opposite the first direction until the locking interface is locked with the complementary locking interface, and wherein the cover is biased to the closed position by a spring.

2. The attachment of claim 1, wherein the body comprises a rigid construction, and wherein the attachment further comprises a bag insertable into the internal volume and configured to receive the clippings.

3. The attachment of claim 1, wherein the cover comprises an opening configured to be in open communication with a debris egress location of the lawn mower.

4. The attachment of claim 1, wherein translating the cover in the first direction is performed after pivoting the cover to the open position.

5. The attachment of claim 1, wherein the attachment comprises an attachment protocol associated with attaching the attachment to the lawn mower, and wherein the attachment protocol is configured to attach to a plurality of different types of lawn mowers.

6. The attachment of claim 5, wherein the attachment protocol is moveable between a stored configuration and an in-use configuration.

7. The attachment of claim 1, wherein the attachment is removably attachable to the lawn mower, and wherein the cover is in the closed position when the attachment is attached to the lawn mower.

8. A lawn mower comprising:
    a mower deck defining a cutting area;
    a cutting implement disposed in the cutting area;
    a debris egress location in communication with the cutting area; and
    an attachment comprising:
        a body including one or more sidewalls defining an internal volume configured to receive clippings from the lawn mower, wherein the body defines an opening configured to be disposed at the debris egress location; and
        a cover coupled to the body at the opening and pivotable between an open position, whereby the opening is open, and a closed position, whereby the opening is closed, wherein the cover comprises:
            an opening configured to be in open communication with the debris egress location of the lawn mower; and
            a handle graspable by an operator to reconfigure the cover between the open and closed positions, wherein the handle comprises a locking interface that is lockable with a complementary locking interface of the body to lock the cover in the open position by translating the cover.

9. The lawn mower of claim 8, wherein the attachment is configured to receive clippings from the cutting area when the cover is in the closed position.

10. The lawn mower of claim 8, wherein locking the cover in the open position is performed by translating the cover in a first direction such that the locking interface passes the complementary locking interface and then translating the cover in a second direction opposite the first direction until the locking interface is locked with the complementary locking interface.

11. The lawn mower of claim 8, wherein the attachment is removably attachable to the lawn mower, and wherein the cover is in the closed position when the attachment is attached to the lawn mower.

12. The lawn mower of claim 8, wherein the attachment is configurable between two or more different lawn mowers, each of the two or more different lawn mowers having a different attachment protocol associated with attaching the attachment to the lawn mower.

13. The lawn mower of claim 8, wherein the body comprises a rigid construction, and wherein the attachment further comprises a bag insertable into the internal volume and configured to receive the clippings.

14. The lawn mower of claim 8, wherein the cover is pivotably coupled to the body and configured to pivot between the open and closed positions, and wherein the cover has at least one additional degree of freedom associated with pivoting between the open and closed positions.

15. The lawn mower of claim 8, wherein the attachment defines a first size, as measured from a top view, that is less than a second size, as measured from the top view, of the handle.

16. A method of using an attachment with a lawn mower, the method comprising:
    removing the attachment from the lawn mower, the attachment having a cover disposed at, and configured to selectively close, an opening of a body of the attachment, wherein the cover is in a closed position whereby the opening is closed;
    reconfiguring the cover to an open position by pivoting the cover from the closed position;
    locking the cover in the open position by translating the cover in a first direction and then translating the cover in a second direction opposite the first direction;
    removing material from an internal volume of the attachment through the opening;
    reconfiguring the cover to the closed position; and
    attaching the attachment to the lawn mower such that the cover is in communication with a debris egress location of the lawn mower.

17. The method of claim 16, further comprising operating the lawn mower such that material is introduced into the attachment from the debris egress location of the lawn mower through an opening in the cover.

18. The method of claim 16, wherein locking the cover further comprises pivoting the cover from the closed position between translating the cover in the first direction and translating the cover in the second direction.

19. The method of claim 16, wherein removing the attachment from the lawn mower comprises removing the attachment from a first type of lawn mower, wherein attaching the attachment to the lawn mower comprises attaching the attachment to a second type of lawn mower, and wherein the first and second types of lawn mowers are different from one another.

20. The method of claim 16, wherein attaching the attachment to the lawn mower includes moving an attachment protocol from a stored configuration to an in-use configuration.

* * * * *